Patented Oct. 20, 1925.

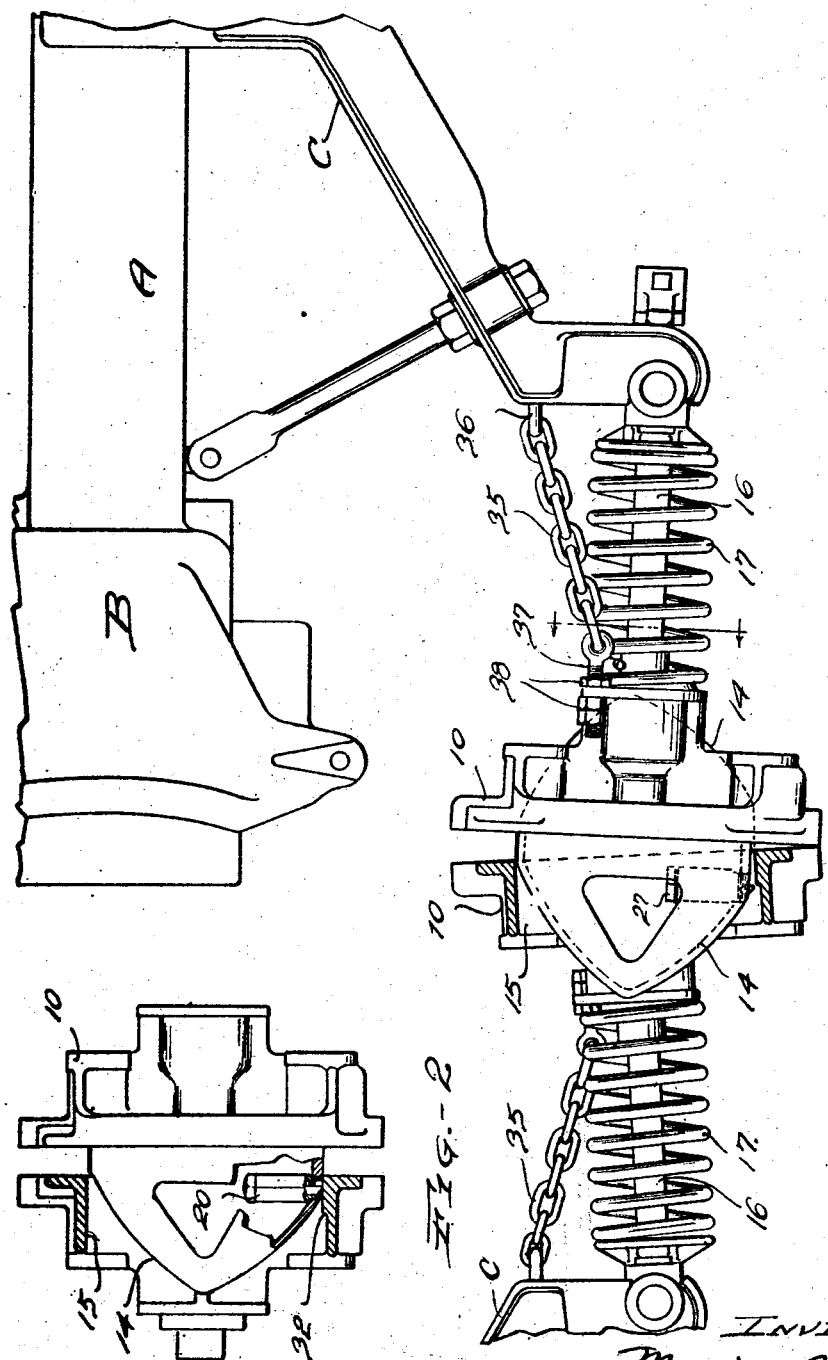

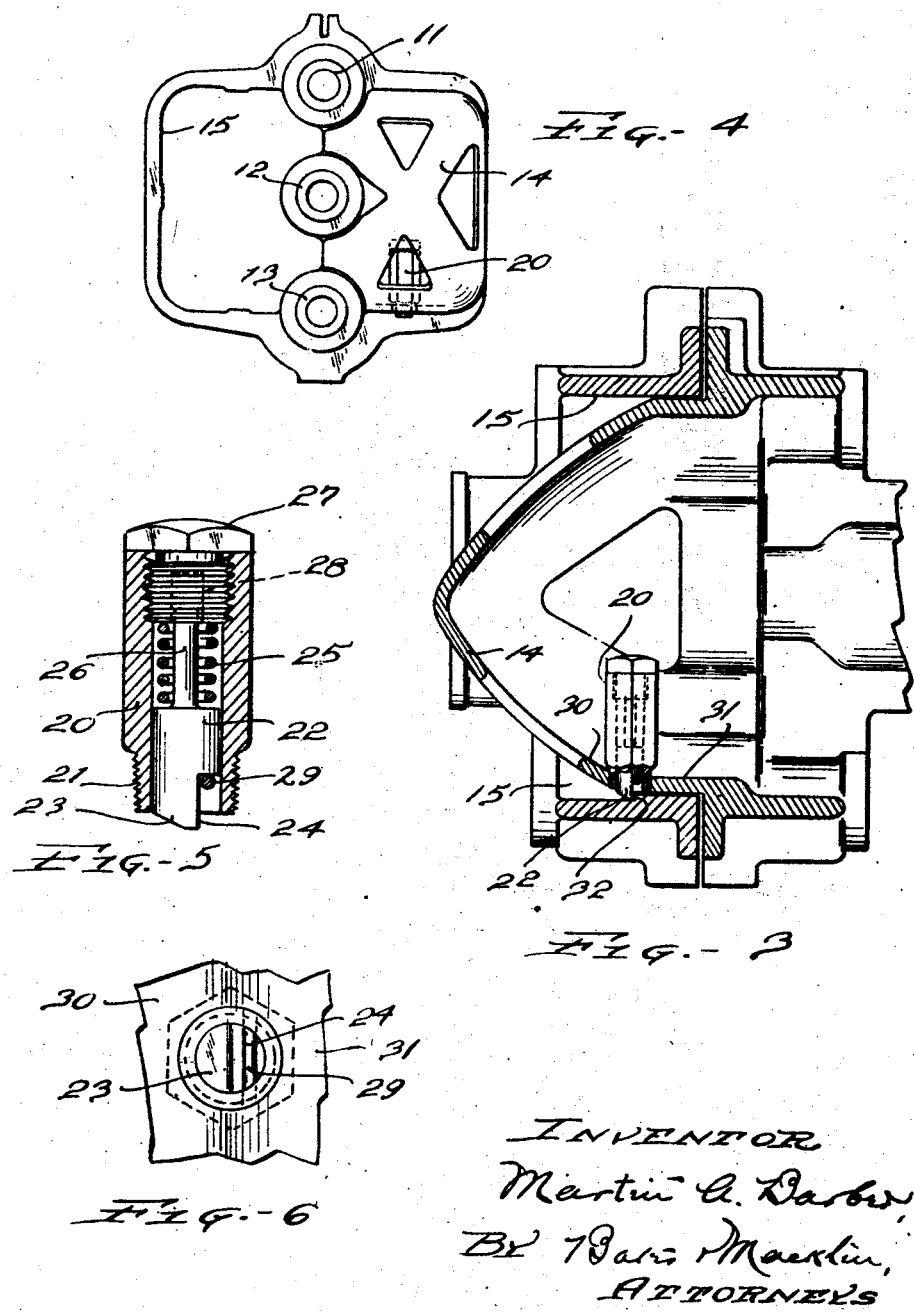

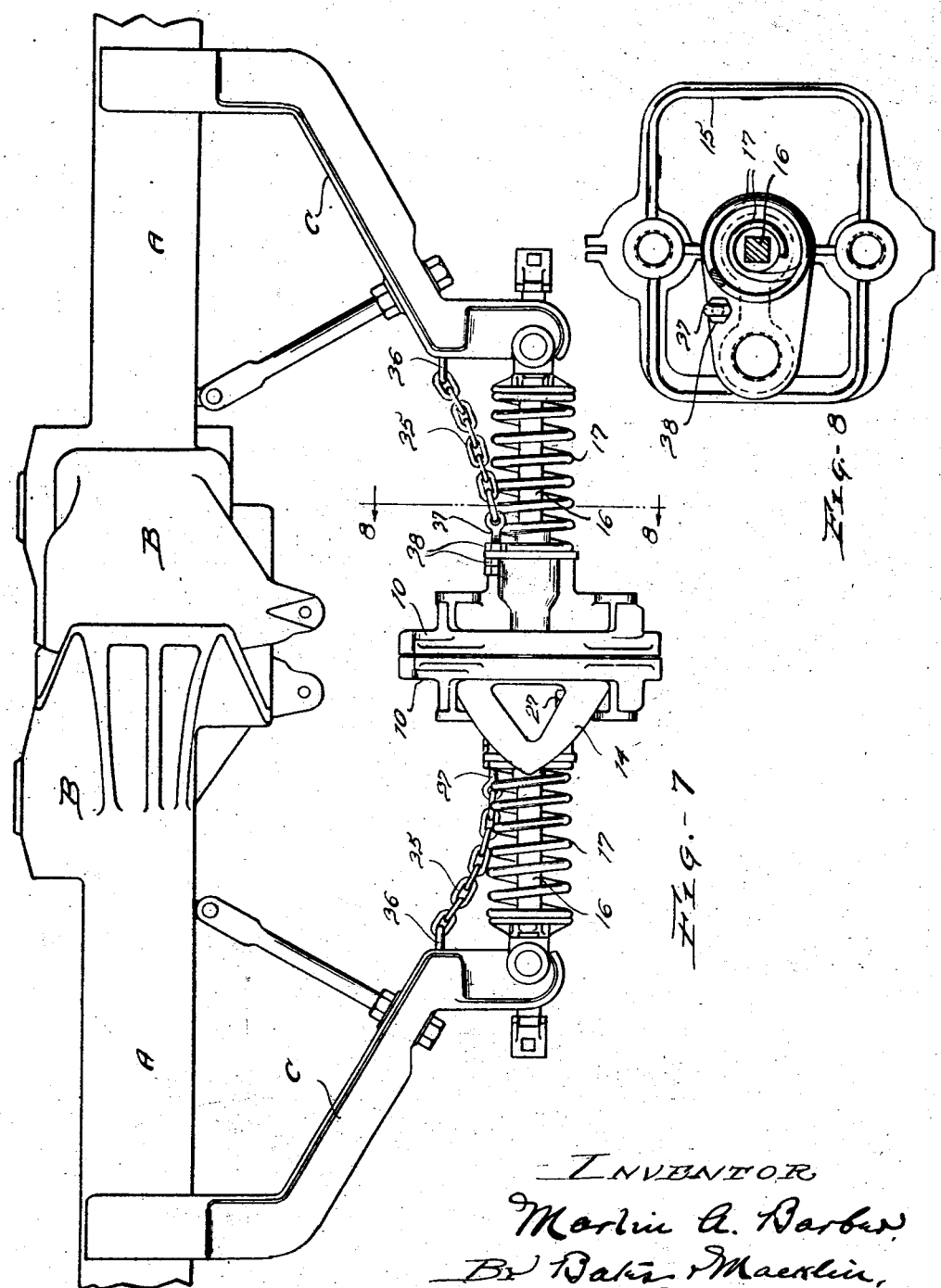

1,557,962

UNITED STATES PATENT OFFICE.

MARTIN A. BARBER, OF CLEVELAND, OHIO, ASSIGNOR TO THE AMERICAN AUTOMATIC CONNECTOR COMPANY, OF WYOMING, DELAWARE, A CORPORATION OF DELAWARE.

LOCK FOR AUTOMATIC TRAIN-PIPE CONNECTERS.

Application filed March 22, 1922. Serial No. 545,666.

*To all whom it may concern:*

Be it known that I, MARTIN A. BARBER, a citizen of the United States, residing at Cleveland, in the county of Cuyahoga and State of Ohio, have invented a certain new and useful Improvement in a Lock for Automatic Train-Pipe Connecters, of which the following is a full, clear, and exact description, reference being had to the accompanying drawings.

This invention relates to automatic train pipe connecters, and is particularly concerned with the provision of means adapted for use in supporting coupled heads when in uncoupled position, and for insuring a close fitting engagement when the heads are in coupled position.

Numerous devices for supporting connecter heads when in uncoupled position have been heretofore used, and some of these devices have been embodied in a cooperating mechanism between the head and supporting bracket. Others have been concerned with the provision of a chain extending between the car coupler or floor beam, and connecter head, with yieldable connections for permitting movement of the head in a vertical plane when the chain is drawn taut. In the former support, if the shank to which the head is secured is bent, the retaining mechanism is ineffective for holding the head in proper coupling position, while in the latter case, the use of yieldable connections with the chain does not produce altogether satisfactory results.

One of the objects of my invention therefore, is the provision of means for supporting connecter heads whereby they are capable of movement in a vertical plane, when in either coupled or uncoupled position without putting undue strain upon the supporting mechanism.

In operating automatic connecters wherein the air signal pipe, air brake pipe and steam pipe are arranged in vertical order, it frequently happens that steam under boiler pressure may occupy the steam pipe, and thereby tend to separate the coupler heads, thus permitting air and steam to escape through the resultant gap.

Accordingly, to overcome this condition, my invention provides for a lock which is automatically operable to retain the connecter heads in close-fitting engagement with each other as soon as the cars are coupled, and thereby to prevent subsequent gapping between the locked heads, by reason of excessive pressure in any of the fluid conducting pipes. The use of the supporting means, in conjunction with the lock may be employed for tilting the heads just prior to disengagement, whereby the connecters may be freely uncoupled when desired. In positioning the lock upon the head however, my invention is concerned with an arrangement whereby the heads may be coupled, or uncoupled, notwithstanding the presence or absence of supporting means hereinbefore referred to.

The means for carrying out my invention as embodied both in the supporting means, and lock, and in the combination of the two, is hereinafter set forth in the following description which pertains to the drawings. The essential characteristics are summarized in the claims.

In the drawings, Fig. 1 is a side elevation showing the connecters in partially coupled position with a portion of one head shown in section to indicate the position of the lock when the latch is released; Fig. 2 is a side elevation of the heads shown in Fig. 1 with a portion thereof in section to indicate the position of the lock when the connecters are in partially coupled position; Fig. 3 is a vertical section taken through a pair of coacting heads; Fig. 4 is an end view of the heads shown in Fig. 3; Fig. 5 is a vertical section on an enlarged scale through the lock; Fig. 6 is a bottom view of the lock when attached to a connecter head; Fig. 7 is a side elevation of a pair of connecters embodying my invention, showing the heads in coupled position; and Fig. 8 is a section on the line 8—8 in Fig. 7.

My invention is adapted for use with various forms of connecters, but in the drawings I have illustrated it in connection with a form of automatic connecter having a spring-pressed coupler head supported by the draw bar of a train coupler, and provided on one side with a projection and on the other side with a recess. This construction is indicated in the various figures wherein A indicates the draw bar of a railway car, B the coupler thereof, and C the bracket depending from the draw bar and carrying the automatic connecters to which the train pipes are adapted to be attached.

The automatic connecter illustrated comprises a head 10 having orifices at 11, 12 and 13 for receiving the air signal pipe, the air brake pipe and the steam pipe, respectively. These orifices as shown in Fig. 4 are arranged in a vertical line adjacent the center of the head, and are positioned intermediate the projection 14 and recess 15. Each head is shown as having a shank 16 which has a sliding and universally movable connection with the bracket C, and as having a strong compression spring 17 surrounding the shank which presses the head away from the bracket so that in normally coupled position the springs are compressed.

My invention is partly concerned with the provision of a lock for retaining the connected heads in coupled position, and to this end I have shown a lock which may be readily secured to each projection and which is adapted to cooperate with a shoulder in the recess with which the projection coacts. In the preferred form, the lock comprises a casing 20 which is externally threaded as at 21, to engage the lower wall of the projection 14, and is of such size as to receive a plunger or latch 22 and to permit longitudinal movement thereof for locking one head to another. The forward engaging face of the latch may be beveled as at 23 away from a retaining shoulder 24 to provide a lock which functions in much the same manner as a door latch, to enable a pair of heads to be readily connected, but to prevent disconnection, or gapping under the influence of excessive pressure in the steam pipe.

The plunger is normally held in the position indicated in Fig. 5 by a spring 25 which surrounds the plunger shank 26. The upper end of the spring is in engagement with the inner end of a plug 27. This plug may be provided with a recess 28 into which the shank of the plunger is adapted to extend. The outer movement of the plunger may be limited by a stop 29 which is shown as a pin extending transversely through the casing. When the lock is secured to the projection 14 it is so positioned that the ramp of the plunger extends forwardly of the projection and in the region where the curved portion 30 merges with the horizontal portion 31, as shown particularly in Fig. 3.

To retain the connecters in locked position, I have shown each head as having a shoulder 32 within the recess 15 and I have illustrated this shoulder in Fig. 3 as being adjacent the locking face of the plunger when the connecters are in coupled position. Since the plunger is free to move upwardly, it follows that the connecters may be readily coupled so long as one head is brought into engagement with the coacting recess on another head. When the cars are about to be uncoupled however, the spring 25 prevents the plunger from moving upwardly, so that other mechanism must be utilized for releasing the latch before the cars can be uncoupled. An effective means for accomplishing this is to tilt the heads upwardly as shown in Fig. 1 thereby raising the plunger above the shoulder 32 just before the heads are disconnected.

The means for raising the heads is shown in Fig. 1 by a chain, one end of which is anchored and the other end of which is adjustable for varying the angle at which the head is held relatively to the bracket C. The preferred manner for arranging this chain is to anchor it, as at 36, to the bracket, and to secure the other end to an eye-bolt 37 which is carried by the connecter head and is adjustable thereon by the nuts 38. The point of anchorage is just above the point at which the head is universally connected to the bracket. This enables the head to be moved in a vertical plane about the point of pivotal connection, even though the chain is drawn taut.

With an arrangement of this character, if the chain should be broken when the heads are coupled, the uncoupling action could occur without shearing the latch 22. This follows by reason of the fact that the point of engagement between the latch and shoulder 32 lies below a plane passing through the point about which the heads are pivotally connected to the respective brackets. The action of the connected heads under such conditions is, that the heads are automatically tilted an amount sufficient to allow the latch to clear the shoulder on the coacting recess, whereby further uncoupling movement frees the coupled heads.

From the foregoing description it will be seen that I have provided means which is well adapted for holding connecter heads in a substantially horizontal position, and for permitting movement of the heads in a vertical plane relative to the supporting member therefor. When this means is used with the lock, also constructed according to my invention, the connecter heads are free to couple and uncouple. The uncoupling, however, though normally restrained by the lock, is still free to occur even though the supporting means ceases to function.

Having thus described my invention, I claim:

1. In an automatic train pipe connecter, the combination with connecter heads having coacting projections and recesses positioned side by side, and having orifices for receiving steam pipes adjacent the bottom of the heads, of means for locking coacting projections and recesses, said means comprising a plunger slidably mounted on each projection adjacent the bottom thereof and in the region of the steam pipe orifice, and a co-operating shoulder on the coacting recesses, and means for normally holding said plunger in engagement with the shoulder when the heads are coupled together.

2. In combination, a pair of connecter heads each having coacting projections and recesses, a yieldable latch associated with each head, said latch permitting the heads to be coupled but preventing them from being uncoupled while they are in substantially horizontal position, and means for tilting the heads during the uncoupling movement for releasing the latch.

3. In combination, a pair of coupling heads each having coacting projections and recesses therein, a yieldable latch associated with each of said heads, and adapted for permitting their free engagement but preventing disengagement while the heads are in substantially horizontal position, and means comprising a flexible member for tilting the heads during uncoupling movement whereby the latches are released and the heads are permitted to be disconnected.

4. In combination, a connecter head, a support therefor, means for pivotally connecting the head to the support, a spring normally urging the head away from the support, a flexible connection between the head and support for limiting outward movement of the spring, said flexible connection being of such character that the head, when in coupled position, may swing about the support without placing any stress upon the flexible connection.

5. In combination, a connecter head, a support therefor, means for pivotally mounting the head upon the support, a spring for normally urging the head forwardly of the support, a chain having one end thereof attached to the support and the other end to the head for limiting vertical movement of the head with reference to the support, said chain being so positioned on the support that vertical movement of the head while in coupled position does not place any great stress upon the chain.

6. In combination, a pair of coupling members, means associated with each member for locking them together in substantially horizontal position, a support for each of said members, and means extending between the support and member for tilting the members and freeing the locks during the uncoupling movement.

7. In combination, a pair of connecter heads, each having coacting projections and recesses therein, means for locking the heads together to prevent uncoupling while the heads are held in substantially horizontal position, a support for each head and a chain extending between each support and head whereby the heads are tilted and the lock is released during the normal uncoupling movement.

8. In combination, two railway cars equipped with automatic couplers, a support rigidly secured to each of said couplers, a connecter head carried by each support, means for yieldingly urging said heads forwardly of the car, cooperating shoulders for normally holding said heads in engagement with each other while the cars are coupled, and a member extending between each head and support, each member being actuated by movement of the heads away from the support during the uncoupling operation for tilting the heads and releasing the shoulders.

9. In combination, two railway cars equipped with automatic couplers, a support rigidly secured to each of said couplers, a connecter head carried by each support, means for yieldingly urging said heads forwardly of the car, a yieldable latch associated with each head for holding them in engagement with each other when the cars are coupled and a chain extending between each support and its associated head for tilting the head during the uncoupling operation whereby the latches are automatically freed.

10. In combination, a pair of supports, a connecter head carried by each support, each head having coacting projections and recesses and having coacting shoulders remote from the meeting faces thereof, means for yieldingly urging each head forwardly of the support, a chain having one end thereof secured to the support, and the other end to the associated head, means for adjusting the length of the chain whereby the heads are tilted during the normal uncoupling operation, and whereby the shoulders are free to permit the uncoupling operation.

11. In combination, a pair of supports, a connecter head carried by each support, vertical cooperating shoulders on said heads, means for yieldingly urging each head forwardly of its associated support, a chain extending between each support and the associated head, one end of the chain being anchored to the support, and the other end being adjustably secured to the head, whereby the heads are tilted and the shoulders are freed during the normal uncoupling operation.

12. In an automatic connecter, the combination with a bracket, of a connecter head having a shank thereon, the shank being supported in the bracket so as to be capable of universal movement relatively thereto, and a chain having one end connected with the head and the other with the bracket above the point at which the shank is supported, whereby the chain is slackened when the head is in coupled position, sufficiently to permit vertical movement of the head about the supporting bracket thereof without drawing the chain taut.

In testimony whereof, I hereunto affix my signature.

MARTIN A. BARBER.